United States Patent
Peng et al.

(10) Patent No.: US 12,242,398 B2
(45) Date of Patent: Mar. 4, 2025

(54) POLLING REGULATION FOR STORAGE INPUT/OUTPUT IN A COMPUTER SYSTEM

(71) Applicant: VMware, Inc., Palo Alto, CA (US)

(72) Inventors: Ran Peng, Beijing (CN); Wenchao Cui, Beijing (CN); Yu Zhao, Beijing (CN); Yang Bai, Beijing (CN); Ruilin Tian, Shanghai (CN)

(73) Assignee: VMware LLC, Palo Alto, CA (US)

( * ) Notice: Subject to any disclaimer, the term of this patent is extended or adjusted under 35 U.S.C. 154(b) by 52 days.

(21) Appl. No.: 18/348,880

(22) Filed: Jul. 7, 2023

(65) Prior Publication Data

US 2024/0403233 A1    Dec. 5, 2024

(30) Foreign Application Priority Data

Jun. 2, 2023    (WO) ................ PCT/CN2023/097979

(51) Int. Cl.
    *G06F 13/16*      (2006.01)

(52) U.S. Cl.
    CPC .......... *G06F 13/16* (2013.01); *G06F 2213/16* (2013.01)

(58) Field of Classification Search
    None
    See application file for complete search history.

(56) References Cited

U.S. PATENT DOCUMENTS

| | | | | |
|---|---|---|---|---|
| 6,560,215 B1* | 5/2003 | Bloem | .............. | H04W 56/0045 370/347 |
| 6,789,142 B2* | 9/2004 | Diamant | ................. | G06F 13/24 710/48 |
| 8,108,582 B2* | 1/2012 | Ambikapathy | ......... | G06F 13/24 710/267 |
| 2004/0117534 A1* | 6/2004 | Parry | ...................... | G06F 13/24 710/260 |
| 2014/0068621 A1* | 3/2014 | Sitaraman | ............... | G06F 9/505 718/102 |

* cited by examiner

*Primary Examiner* — Michael Sun
(74) *Attorney, Agent, or Firm* — Kim & Stewart LLP (57) ABSTRACT

An example method of input/output (IO) between system software executing in a computer and a storage device includes: sending, from the system software, IO commands to the storage device; handling, by the system software, IO completion messages from the storage device in an interrupt mode; determining, while processing the IO commands, a first value for a measure of IO operations per second (IOPs) of the storage device; determining, by a device driver of the system software, that a first condition is met, the first condition being that the measure of IOPs satisfies a threshold for enabling a polling mode; determining, by the device driver, that a second condition is met, the second condition being that a timer started in an interrupt mode has not expired; and maintaining, by the device driver, the interrupt mode in response to the second condition despite the first condition.

20 Claims, 8 Drawing Sheets

POLLING REGULATION FOR STORAGE INPUT/OUTPUT IN A COMPUTER SYSTEM

CROSS-REFERENCE

This application is based upon and claims the benefit of priority from International Patent Application No. PCT/CN2023/097979, filed on Jun. 2, 2023, the entire contents of which are incorporated herein by reference.

BACKGROUND

Data center applications today can exhibit high input/output (IO) rates. The applications can issue many IO requests in parallel, which must be handled by the storage system. Storage devices, such as solid-state drives, (SSDs), can handle millions of IO operations per second (IOPs). The computers to which the storage devices attach execute system software having device drivers that provide software interfaces to the storage devices.

A device driver can maintain queues for IO commands to a storage device and IO completions received from the storage device. The device driver issues IO commands from a queue to the storage device. In one mode, the device driver then waits for the storage device to process the IO commands and update queue(s) with IO completions. IO commands issued to the storage device and not yet acknowledged as completed by the storage device are referred to as open IO (OIO) commands. While waiting for completion of OIO commands, the system software controls the processor to execute other thread(s). The storage device generates a hardware interrupt when completing an IO command and storing an IO completion in a completion queue. The processor handles the interrupt and calls an interrupt handler of the system software. The interrupt handler in turn notifies the device driver and the device driver handles the IO completion. This interrupt mode, however, can generate many interrupts to be handled by the processor and system software, which decreases IO performance and overall system performance.

To reduce such an "interrupt storm" and improve IO performance, another technique is for the system software to poll for IO completions. In a polling mode, hardware interrupts by the storage device are disabled. The device driver issues IO commands in to the storage device and the storage device completes the IO commands and stores IO completions in queue(s). The device driver polls for completion responses for OIO commands, e.g., by monitoring the queues. The polling mode avoids processing many interrupts and can improve IO and system performance.

Storage devices, including modern SSDs, are exhibiting lower latencies. A low-latency storage device can support higher IO operations per second. Polling prevents the processor from doing other work and can become less efficient depending on IO operations per second and the number of OIO commands. This results in loss of IO and system performance even compared with traditional interrupt mode.

SUMMARY

In an embodiment, a method of input/output (IO) between system software executing in a computer and a storage device is described. The method comprises sending, from the system software, IO commands to the storage device. The method further comprises handling, by the system software, IO completion messages from the storage device in an interrupt mode. The method further comprises determining, while processing the IO commands, a first value for a measure of IO operations per second (IOPs) of the storage device. The method comprises determining, by a device driver of the system software, that a first condition is met, the first condition being that the measure of IOPs satisfies a threshold for enabling a polling mode. The method further comprises determining, by the device driver, that a second condition is met, the second condition being that a timer started in an interrupt mode has not expired. The method comprises maintaining, by the device driver, the interrupt mode in response to the second condition despite the first condition.

Further embodiments include a non-transitory computer-readable storage medium comprising instructions that cause a computer system to carry out the above method, as well as a computer system configured to carry out the above method.

DETAILED DESCRIPTION

Polling regulation for storage input/output (IO) in a computer system is described. In embodiments, the computer system comprises system software executing on a hardware platform. The hardware platform includes an interface to a storage device, such as a solid-state drive (SSD). The system software includes a storage stack configured to process input/output (IO) requests originating from software and a device driver configured to cooperate with a device controller of the storage device to implement the IO requests. The device driver sends IO commands to the device controller. The device controller stores IO completion messages ("IO completions") for the IO commands in system memory (e.g., random-access memory (RAM) of the hardware platform). The system software operates in a selected mode to handle the IO completions. The device driver monitors IO operations per second (IOPs) of the storage device while processing the IO commands and sets the mode to either a polling mode or an interrupt mode according to polling regulation logic.

In the interrupt mode, the device driver sends the IO commands to the storage device, which become outstanding IO (OIO) commands. The device driver, which is executed by a processor of the hardware platform, waits for completion of OIO commands. While the device driver waits, the system software can configure the processor to execute other thread(s). The storage device stores IO completions in the system memory and generates hardware interrupt(s) for the processor. In response, the processor calls an interrupt handler of the system software, which in turn notifies the device driver. The device driver and storage stack then handle the completion of the IO commands. In the polling mode, the device driver does not enter a wait state after sending the IO commands. Rather, the device driver polls for completion of the OIO commands (e.g., by checking the system memory for the IO completions). The device driver and storage stack then handle the completion of the IO commands.

In embodiments, the polling regulation logic of the device driver controls the switching between polling and interrupt modes. Polling regulation logic monitors IOPs and generally selects the polling mode for higher IOPs and interrupt mode for lower IOPs to maximize IO and system performance. Frequent switching between modes, however, can lead to lower overall performance. To mitigate frequency switching, polling regulation logic can selectively enforce interrupt mode on a temporary basis even when conditions would otherwise trigger polling mode. This regulates IOPs and improves overall IO and system performance as compared to frequent switching between modes. These and further aspects are described below with respect to the drawings.

Figure 1A:
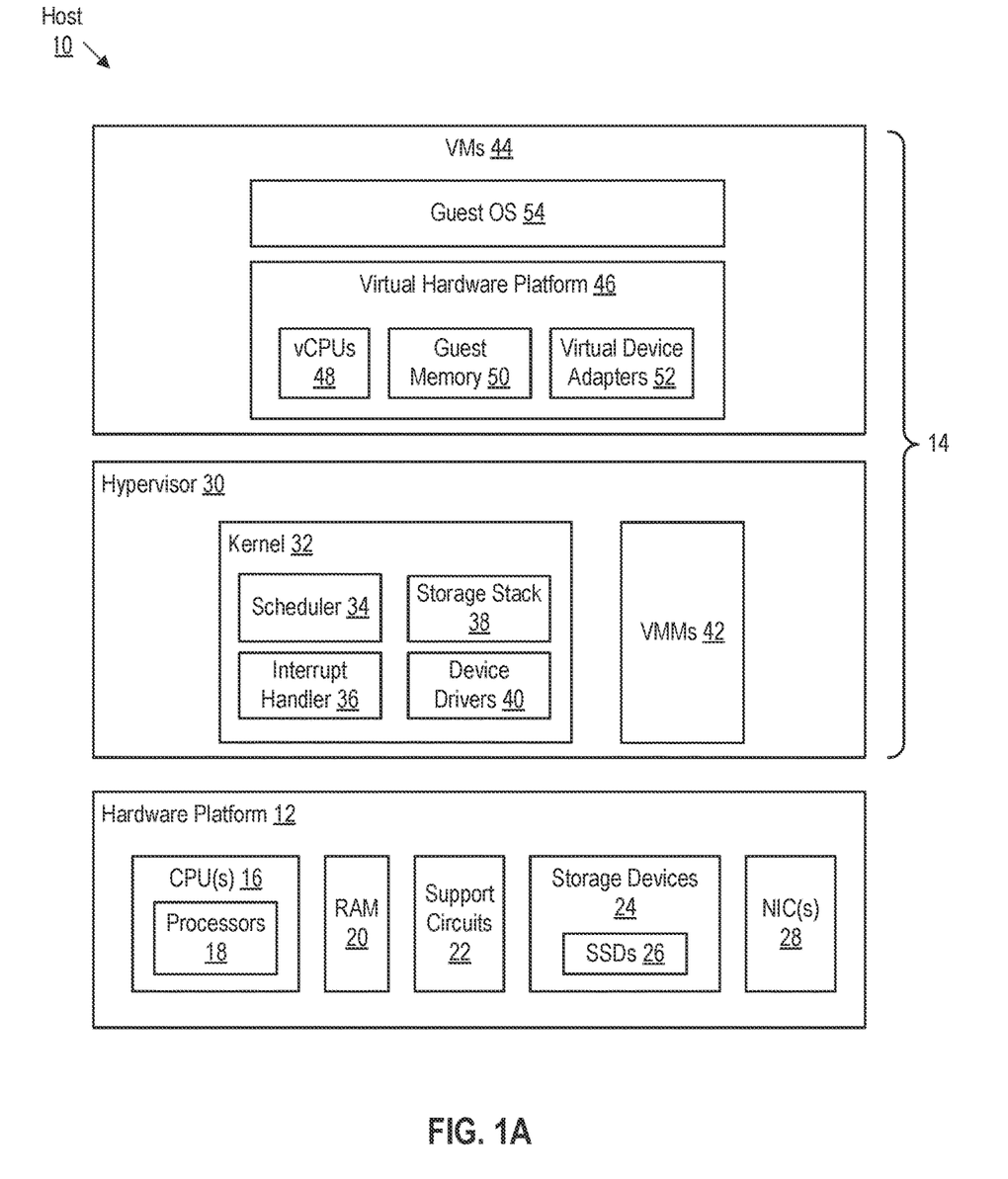
FIG. 1A is a block diagram depicting a host computer system according to embodiments.

FIG. 1A is a block diagram depicting a host computer system ("host") 10 according to embodiments. Host 10 is an example of a virtualized host. Host 10 includes software 14 executing on a hardware platform 12. Hardware platform 12 includes conventional components of a computing device, such as one or more central processing units (CPUs) 16, system memory (e.g., random access memory 20), one or more network interface controllers (NICs) 28, support circuits 22, and storage devices 24.

Each CPU 16 is configured to execute instructions, for example, executable instructions that perform one or more operations described herein, which may be stored in RAM 20. CPU(s) 16 include processors 18. Each processor 18 can be a core or hardware thread in a CPU 16 and comprises an independent execution unit. For example, a CPU 16 can be a microprocessor, with multiple cores and optionally multiple hardware threads for core(s), each having an x86 or ARM® architecture. The system memory is connected to a memory controller in each CPU 16 or in support circuits 22 and comprises volatile memory (e.g., RAM 20). Storage (e.g., each storage device 24) is connected to a peripheral interface in each CPU 16 or in support circuits 22. Storage is persistent (nonvolatile). As used herein, the term memory (as in system memory or RAM 20) is distinct from the term storage (as in a storage device 24).

Each NIC 28 enables host 10 to communicate with other devices through a network (not shown). Support circuits 22 include any of the various circuits that support CPUs, memory, and peripherals, such as circuitry on a mainboard to which CPUs, memory, and peripherals attach, including buses, bridges, cache, power supplies, clock circuits, data registers, and the like. Storage devices 24 include magnetic disks, SSDs 26, and the like as well as combinations thereof. The polling techniques described herein are advantageous when used with low-latency storage devices so storage devices such as magnetic disks are omitted for clarity.

Software 14 comprises hypervisor 30, which provides a virtualization layer directly executing on hardware platform 12. In an embodiment, there is no intervening software, such as a host operating system (OS), between hypervisor 30 and hardware platform 12. Thus, hypervisor 30 is a Type-1 hypervisor (also known as a "bare-metal" hypervisor).

Hypervisor 30 abstracts processor, memory, storage, and network resources of hardware platform 12 to provide a virtual machine execution space within which multiple virtual machines (VM) 44 may be concurrently instantiated and executed.

Hypervisor 30 includes a kernel 32 and virtual machine monitors (VMMs) 42. Kernel 32 is software that controls access to physical resources of hardware platform 12 among VMs 44 and processes of hypervisor 30. Kernel 32 includes scheduler 34, storage stack 38, interrupt handler 36, and device drivers 40. Scheduler 34 schedules processes and threads for execution by processors 18. Storage stack 38 includes one or more layers of software for handling storage IO requests from guest software in VMs 44 to local storage 24. Device drivers 40 comprise software for interfacing with devices in hardware platform 12 including storage devices 24. Interrupt handler 36 comprises software configured for execution by processors 18 in response to hardware interrupts ("interrupts") handled by processors 18. A hardware interrupt is a signal generated by a device in hardware platform, such as an SSD 26, and received by a processor 18. In response to such an interrupt, a processor 18 switches execution context to execute interrupt handler 36 as specified by hypervisor 30. A VMM 42 implements virtualization of the instruction set architecture (ISA) of CPU(s) 16, as well as other hardware devices made available to VMs 44. A VMM 42 is a process controlled by kernel 32 and can include one or more threads.

A VM 44 includes guest software comprising a guest OS 54. Guest OS 54 executes on a virtual hardware platform 46 provided by one or more VMMs 42. Guest OS 54 can be any commodity operating system known in the art. Virtual hardware platform 46 includes virtual CPUs (vCPUs) 48, guest memory 50, and virtual device adapters 52. Each vCPU 48 can be a VMM thread. A VMM 42 maintains page tables that map guest memory 50 (sometimes referred to as guest physical memory) to host memory (sometimes referred to as host physical memory). Virtual device adapters 52 can include a virtual storage adapter for accessing, local storage 24.

Figure 1B:
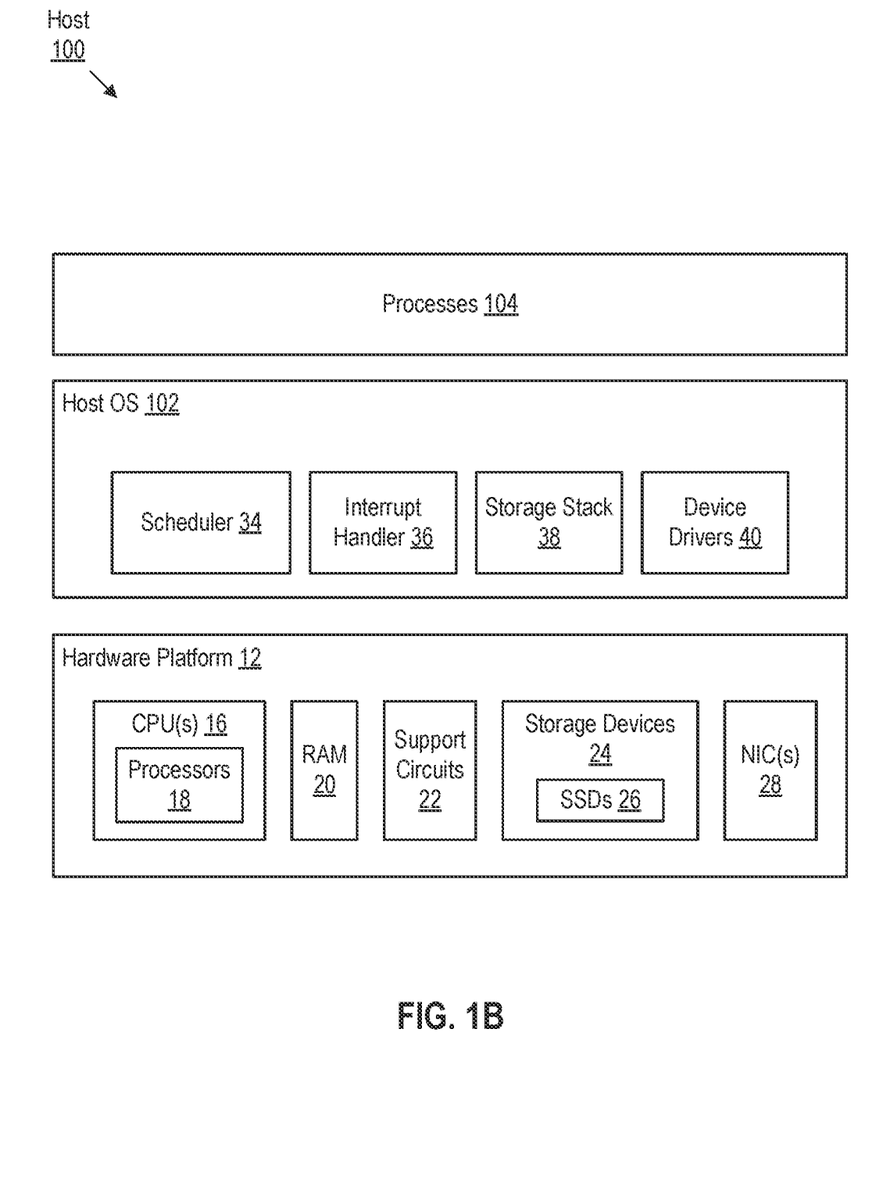
FIG. 1B is a block diagram depicting another host computer system according to embodiments.

FIG. 1B is a block diagram depicting a host 100 according to embodiments. Host 100 is an example of a non-virtualized host. Host 100 comprises a host OS 102 executing on a hardware platform. The hardware platform in FIG. 1B is identical to hardware platform 12 and thus designated with identical reference numerals. Host OS 102 can be any commodity operating system known in the art. Host OS 102 includes functionality of kernel 32 as shown in FIG. 1A, including scheduler 34, interrupt handler 36, storage stack 38, and device drivers 40. Host OS 102 manages processes 104, rather than virtual machines. The polling regulation techniques described herein can be performed in a virtualized host, such as that shown in FIG. 1A, or a non-virtualized host, such as that shown in FIG. 1B.

Figure 2:
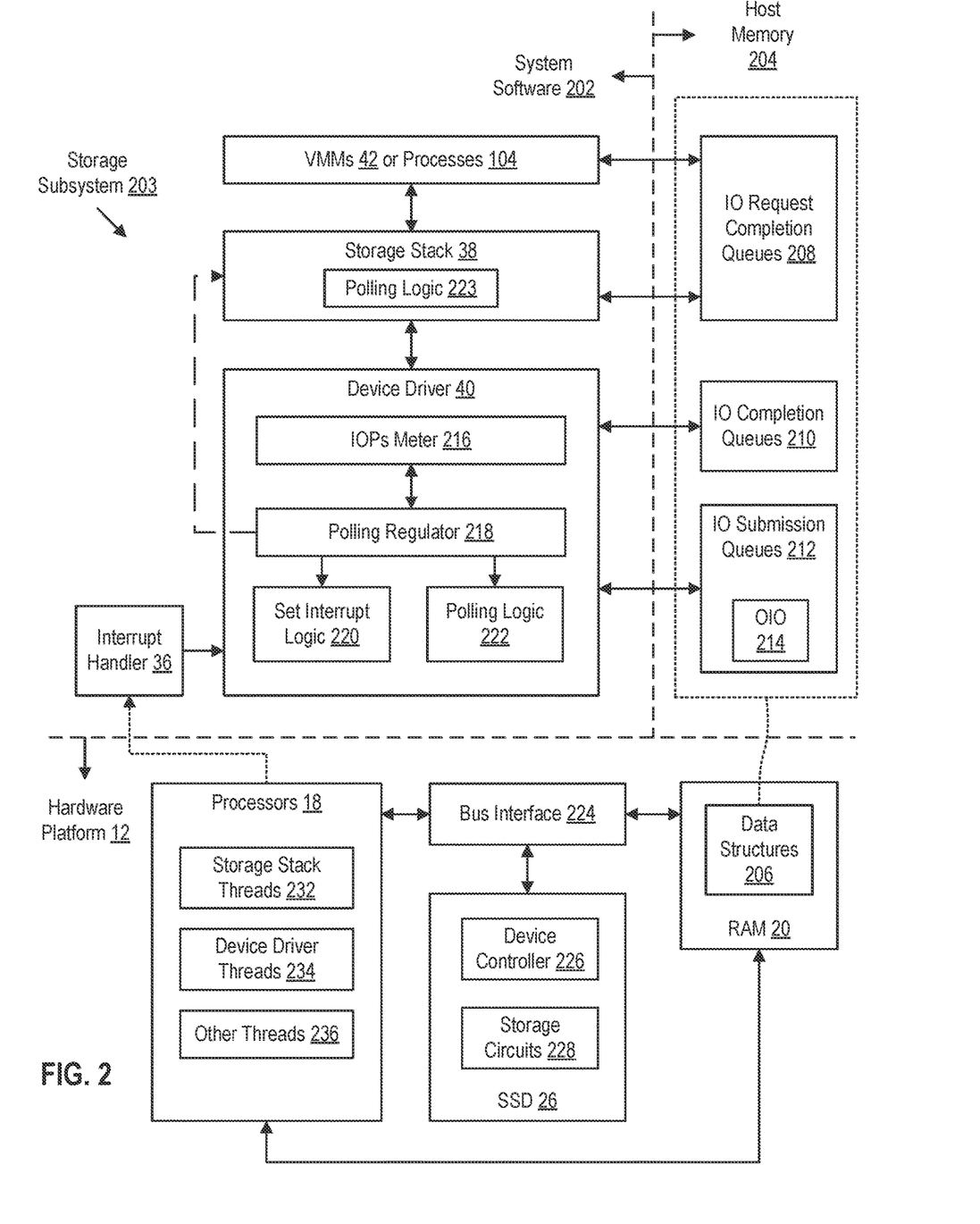
FIG. 2 is a block diagram depicting logical operation of system software to handle IO requests for a storage device according to embodiments.

FIG. 2 is a block diagram depicting logical operation of system software to handle IO requests for a storage device according to embodiments. FIG. 2 shows components of system software 202 in cooperation with components of hardware platform 12 and data structures 206 in host memory 204. System software 202 can be hypervisor 30 in a virtualized host or host OS 102 in a non-virtualized host. Hardware platform 12 includes processors 18, an SSD 26, and RAM 20, as shown in FIGS. 1A-1B. Processors 18 are connected to RAM 20 through a bus or interconnect (part of support circuits 22). Data structures 206 of host memory 204 are stored in RAM 20 and accessed by system software 202 and SSD 26. System software 202 includes interrupt handler 36 and a storage subsystem 203, which comprises storage stack 38 and a device driver 40. VMMs 42 or processes 104 submit IO requests to storage subsystem 203 depending on whether system software 202 is hypervisor 30 or host OS 102.

Hardware platform 12 includes a bus interface 224 connected to a device controller 226 of SSD 26. SSD 26 comprises storage circuits 228 and device controller 226. Storage circuits 228 comprise integrated circuit (IC) assemblies to store data persistently (e.g., flash memory). In embodiments, device controller 226 implements a version of the Non-Volatile Memory Host Controller Interface Specification (NVMHCIS) commonly referred to as Non-Volatile Memory Express (NVMe®). NVMHCIS is an open, logical-device interface specification for accessing non-volatile storage attached via a Peripheral Component Interface Express (PCIe) bus. Thus, in embodiments, bus interface 224 comprises a PCIe bus. SSD 26 can have any of various form factors, such as a drive form factor, a PCIe card form factor, an M.2 card form factor, or the like. Processors 18 and RAM 20 are coupled to bus interface 224 (e.g., via a root complex in support circuits 22). Processors 18, through execution of system software 202, can send data to, and receive data from, device controller 226. Device controller 226 can write data to, and read data from, RAM 20 using Direct Memory Access (DMA).

While a specific example is described with respect to an NVMe device controller connected to a PCIe bus, it is to be understood that the techniques described herein can be used with other device controllers and buses, such a Serial AT Attachment (SATA) device controller coupled to an Advanced Host Controller Interface (AHCI) bus adapter or an NVMe device controller coupled to a SATA Express (SATAe) bus. However, the techniques described herein are advantageous when used with low-latency storage devices, which are typically implemented as NVMe devices connected to the PCIe or SATAe bus. Further, while SSD 26 is described as part of hardware platform 12 of the host, in some examples, SSD 26 can be remote from the host and be connected to a host interface (e.g., a host bus adapter, NIC, etc.) using NVMe over Fabrics (NVMe-oF™).

Device driver 40 is a software interface to SSD 26 and is configured to send IO commands to device controller 226 based on IO requests received from storage stack 38. IO commands are commands understood by device controller 226, such as NVMe commands, which include but are not limited to a write command for writing data to storage device 228 (e.g., nvme-write) and a read command for reading data from storage device 228 (e.g., nvme-read). Storage stack 38 receives IO requests from originating software (e.g., guest software in a VM via a VMM or a process managed by a host OS) and processes the IO requests through various software layers (e.g., Small Computer System Interface (SCSI) layer, file system layers, logical volume layer, device access layer, and the like known in the art). While the originating software in the example executes in the host, in other examples, the originating software can execute external to the host (e.g., NVMe over remote DMA (RDMA) transport).

Device driver 40 maintains queues consistent with the protocol implemented by device controller 226. Such queues include IO submission queues 212 and IO completion queues 210. Storage subsystem 203 can establish a submission queue and completion queue pair associated with each processor 18. Storage subsystem 203 inserts IO commands in IO submission queues 212. An IO command includes a command or commands understood by device controller, as well as a command identifier and address information in RAM 20 for use with data transfers (e.g., buffers of data to be written, buffers into which data is to be read). Device controller 226 inserts IO completions in IO completion queues 210. An IO completion provides status for a completed IO command (e.g., success or error). An IO completion can include a unique identifier formed from a combination of an associated IO submission queue and IO command identifier. An IO completion can also include a phase tag that indicates whether its entry in an IO completion queue 210 is new or already processed. At any given time, IO submission queues 212 include zero or more outstanding IO (OIO) commands 214. Each OIO command 214 is an IO command, issued to device controller 226, for which device controller 226 has yet to provide an associated IO completion in an IO completion queue 210. Device driver 40 can "close" an OIO command 214 when handling an associated IO completion in IO completion queues 210. Storage stack 38 can maintain its own queues 208, shared with VMMs 42 or processes 104, for tracking and notifying completion of IO requests ("IO request completion queues 208").

Device driver 40 includes an IOPs meter 216, a polling regulator 218, set interrupt logic 220, and polling logic 222. Storage subsystem 203 operates in a mode selected from an interrupt mode or a polling mode ("selected mode"). Polling regulator 218 in device driver 40 dictates the selected mode based on a measure of IOPs obtained from IOPs meter 216. Polling regulator 218 can control set interrupt logic 220 for enabling/disabling interrupt mode (e.g., by enabling/disabling interrupts generated by device controller 226 and/or handled by processors 18). In an embodiment, polling regulator 218 can control polling logic 222 for enabling/disabling polling mode. In another embodiment, polling regulator 218 notifies storage stack 38 to enable/disable polling mode. In the polling mode, storage stack 38 can execute polling logic 223, which in turn calls polling logic 222 of device driver 40. In general, interrupt mode and polling mode are exclusive of one another (e.g., either interrupt mode is enabled and polling mode is disabled or interrupt mode is disabled and polling mode is enabled).

Figure 3A:
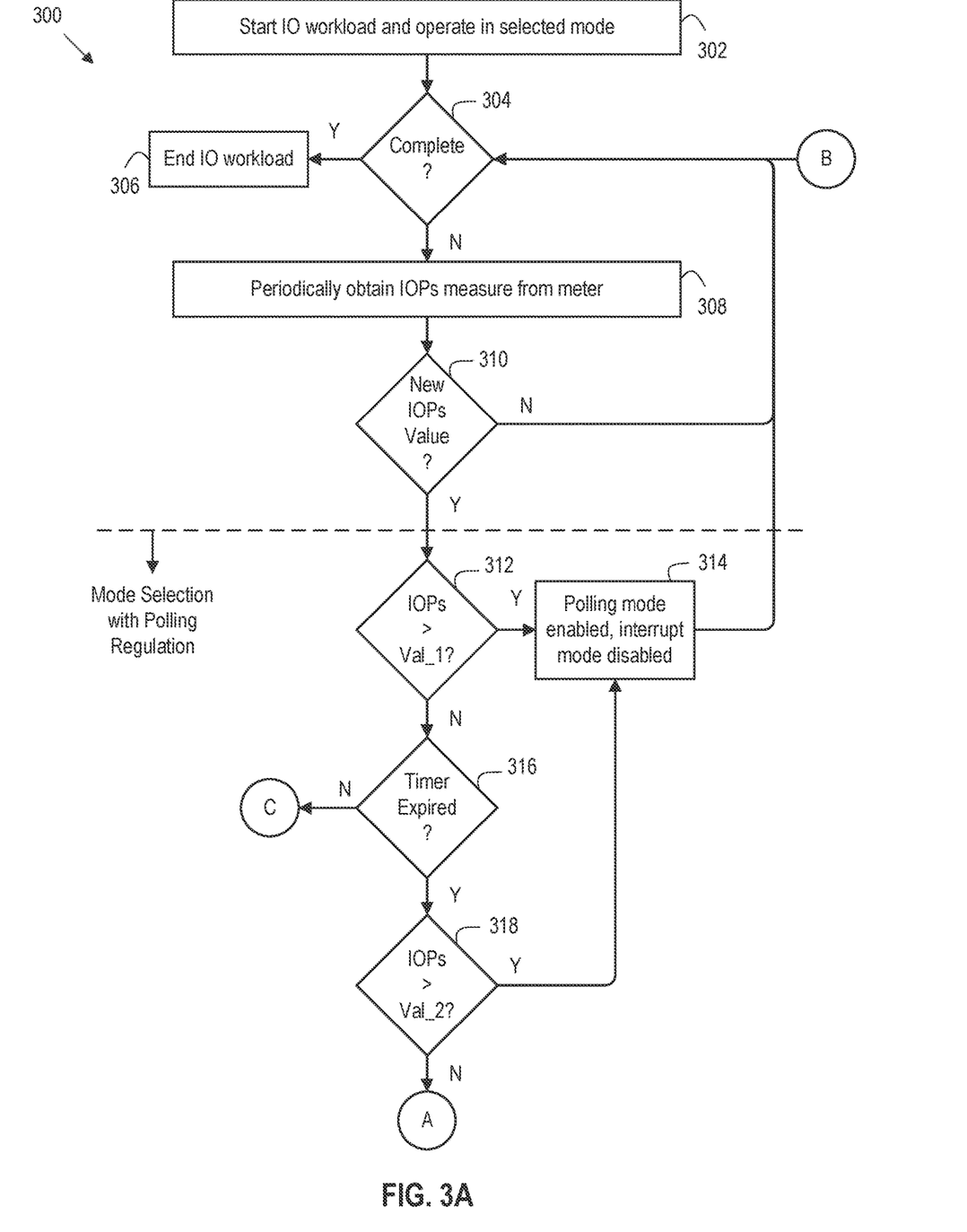
FIGS. 3A-3B depict a flow diagram showing a method of polling regulation by a storage subsystem during IO between system software and a storage device according to embodiments.
Figure 3B:
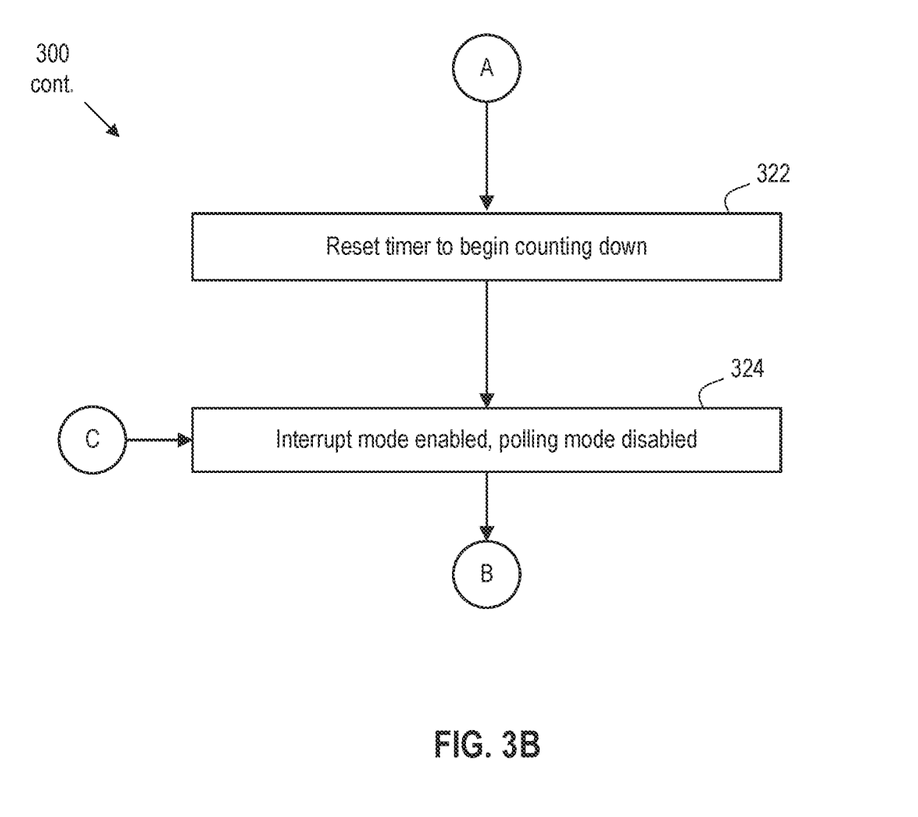

FIGS. 3A-3B depict a flow diagram showing a method 300 of polling regulation by a storage subsystem during IO between system software and a storage device according to embodiments. Method 300 begins at step 302, where storage subsystem 203 starts an IO workload and operates in the selected mode. IO workload includes a batch of IO requests from originating software that result storage subsystem 203 inserting a batch of IO commands in IO submission queues 212. The selected mode comprises an initial mode, which can be the interrupt mode or the polling mode (e.g., one or the other mode can be a default mode or the last mode selected by device driver 40). The IO workload includes device driver 40 sending IO commands in IO submission queues 212 to device controller 226 of SSD 26. During IO workload, there can be a variable number of OIO 214, and a variable amount of IOPs performed by SSD 26, until the IO workload is complete. Batches of IO commands are described for ease of explanation and it is to be understood that, in some embodiments, storage subsystem 203 continuously processes IO requests on behalf of originating software as such IO requests are received.

At step 304, storage subsystem 203 determines if the IO workload is complete. If so, method 300 proceeds to step 306 to end the IO workload. Otherwise, method 300 proceeds from step 304 to step 308. At step 308, polling regulator 218 periodically obtains an IOPs measure from IOPs meter 216. Polling regulator 218 can maintain a current value of IOPs being performed by SSD 26 during the IO workload. Polling regulator 218 refreshes this current value of IOPs at step 308. At step 310, polling regulator 218 determines if there is a new IOPs value available from IOPs meter 216. If not, method 300 returns to step 304. If there is a new IOPs value, method 300 proceeds from step 310 to step 312. A new IOPs value triggers a mode selection process with polling regulation.

Before describing the process of mode selection with polling regulation, a brief description of the problem is given. Consider a low-latency storage device, such as a low-latency SSD. An IO workload includes a batch of IO commands inserted in some number of submission queues depending on the number of processors selected to handle the IO workload (e.g., two queues for two processors, four queues for four processors, etc.). The device driver (without polling regulation described herein) selects between interrupt mode and polling mode using the following criteria: (1) the OIO is greater than a defined threshold; or (2) the IOPs of the storage device is greater than a defined threshold. If either condition is true, the device driver can select the polling mode. If neither condition is true, the device driver can select the interrupt mode.

For a low-latency storage device (e.g., on the order of 6 microseconds per IO command), condition (1) may never occur since the lower latency of the device results in higher IO command throughput. However, the lower latency also means that condition (2) can occur even while in interrupt mode, causing the device driver to switch to polling mode. The polling routine polls for completion based on an accumulation of OIO reaching a threshold. That is, after polling mode is activated, the device driver can wait until OIO exceeds a threshold before executing the polling routine. While waiting, the polling routine sleeps. Once the OIO exceeds the threshold or the sleep timer expires, the polling routine executes. The delay in executing the polling routine results in a drop of IOPs at the device. The IOPs drop below the threshold in condition (2) causing an immediate switch to interrupt mode. Once back in interrupt mode, the IOPs increase, causing condition (2) and the switch back to polling mode. In conclusion, with low OIO associated with low-latency storage devices, without polling regulation, the storage subsystem frequently switches between interrupt mode and polling mode, which results in decreased IO performance.

Returning to FIGS. 3A-3B, method 300 employs polling regulation in the mode selection to mitigate the frequent switching between interrupt mode and polling mode and improve IO performance. At step 312, polling regulator 218 determines whether the current IOPs value exceeds a first threshold value (Val_1). If IOPs exceed the first threshold value (Val_1), polling regulator 218 immediately switches to the polling mode. In such case, method 300 proceeds from step 312 to step 314. At step 314, polling regulator 218 enables the polling mode and disables the interrupt mode. Note that enabling/disabling does not imply the previous state. Thus, polling regulator 218 can enable the polling mode and disable the interrupt mode while the current selected mode is either the polling mode or the interrupt mode. Method 300 returns to step 304 from step 314. The first threshold value (Val_1) can be set such that it is probable that OIO is large enough for immediate execution of the polling routine.

If at step 312 the current IOPs value does not exceed the first threshold (Val_1), method 300 proceeds to step 316. At step 316, polling regulator 218 determines whether an interrupt timer ("timer") has expired. In an embodiment, the timer comprises a countdown timer that is reset as described below. If the timer is expired, method 300 proceeds from step 316 to step 318.

At step 318, polling regulator 218 determines whether the current IOPs value exceeds a second threshold (Val_2). The second threshold value is less than the first threshold value (Val_2<Val_1). If IOPs exceed the second threshold value (Val_2), and if the timer has expired (step 316 is a precondition to reaching step 318), then method 300 proceeds to step 314, where polling regulator 218 enables the polling mode and disables the interrupt mode. If at step 318 the current IOPs value does not exceed the second threshold (Val_2), method 300 proceeds to step 322.

At step 322, polling regulator 218 resets the timer to its initial value. The timer begins counting down from its initial value. At step 324, polling regulator 218 enables the interrupt mode and disables the polling mode. Method 300 returns to step 304 from step 324. Returning to step 316, if polling regulator 218 determines that the timer has not expired, method 300 proceeds from step 316 to step 324, where polling regulator 218 enables the interrupt mode and disables the polling mode.

Consider the following example. Method 300 includes a first Boolean test ("first test") whether a measure of IOPs, while processing IO commands, satisfies a threshold for regulated enabling of the polling mode (steps 312, 318). That is, the first test determines whether the IOPs measure is between Val_1 and Val_2. A first condition is that the measure of IOPs does satisfy the threshold for regulated enabling of the polling mode (e.g., the first test evaluates to TRUE). Method 300 includes a second Boolean test ("second test") of whether the timer started in interrupt mode has expired (step 316). A second condition is that the timer has not expired (e.g., the second test is FALSE). Polling regulator 218 enables the interrupt mode and disables the polling mode in response to the second condition despite the first condition.

Method 300 includes a third Boolean test ("third test") whether the measure of IOPs, while processing IO commands, exceeds the first threshold (Val_1) (e.g., a threshold for immediate, unregulated enabling of the polling mode) (step 312). After polling regulator 218 updates the current value of the IOPs measure, a third condition is that the measure of IOPs exceeds the first threshold (Val_1) (e.g., the third test is TRUE). Polling regulator 218 enables the interrupt mode and disables the polling mode in response to the third condition regardless of the state of the timer.

Method 300 includes a fourth Boolean test ("fourth test") whether the measure of IOPs, while processing IO commands, is greater than the second threshold (Val_2) (e.g., a threshold for immediate, unregulated enabling of the interrupt mode) (step 318). After polling regulator 218 updates the current value of the IOPs measure, an alternative third condition is that the measure of IOPs is less than the second threshold (Val_2) (e.g., the fourth test is FALSE). Polling regulator 218 enables the interrupt mode and disables the polling mode in response to the alternative third condition, while also resetting the timer.

After polling regulator 218 updates the current value of the IOPs measure, an alternative third condition is that the measure of IOPs is between the first threshold (Val_1) and the second threshold (Val_2). Also, a fourth condition is that the timer has expired. In the case of both the alterative third condition and the fourth condition, polling regulator 218 enables the polling mode and disables the interrupt mode.

Figure 4:
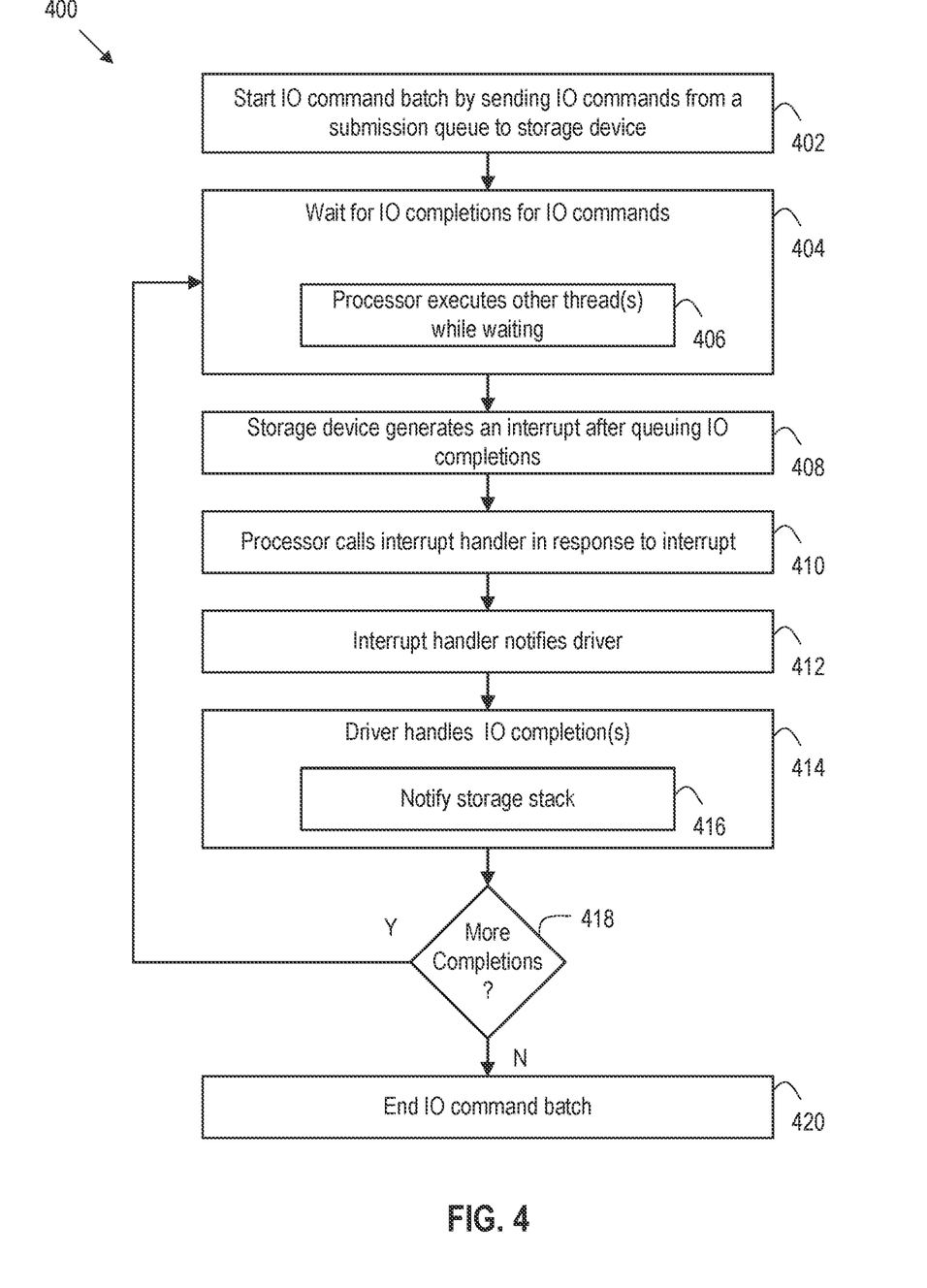
FIG. 4 is a flow diagram depicting a method of handling IO command completions in an interrupt mode according to embodiments.

FIG. 4 is a flow diagram depicting a method 400 of handling IO command completions in an interrupt mode according to embodiments. Method 400 begins at step 402, where device driver 40 starts an IO command batch by sending IO commands from an IO submission queue 212 to the storage device (e.g., SSD 26). At step 404, device driver 40 waits for IO completions to be stored in a corresponding IO completion queue 210. While device driver 40 is waiting for the IO completions, processor 18 can execute other thread(s) (step 406). Processor 18 can execute storage stack threads 232 or any other threads 236 or any other device driver threads 234 (FIG. 2). At step 408, the storage device generates an interrupt after queuing IO completion(s). Storage device can generate an interrupt after just one IO completion or after coalescing multiple IO completions. At step 410, processor 18 receives the interrupt and calls interrupt handler 36. At step 412, interrupt handler 36 notifies driver 40. At step 414, device driver 40 handles the IO completion(s). At step 416, driver 40 can notify storage stack 38 of the IO completions. At step 418, device driver 40 determines if there are more IO completions to be handled. If so, method 400 returns to step 404. Otherwise, method 400 proceeds to step 420, where device driver 40 ends the IO command batch.

Figure 5:
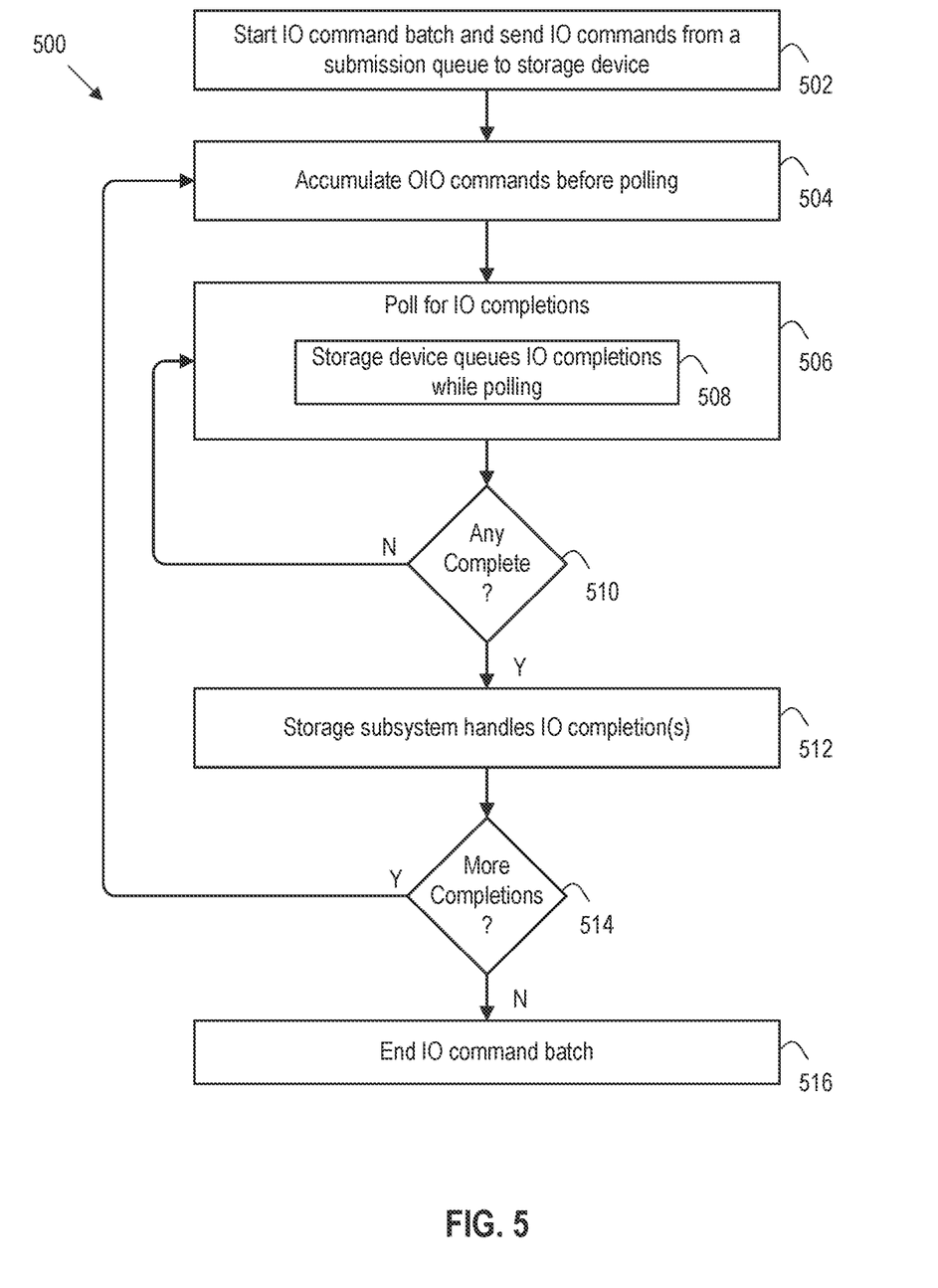
FIG. 5 is a flow diagram depicting a method of handling IO command completions in a polling mode according to embodiments.

FIG. 5 is a flow diagram depicting a method 500 of handling IO command completions in a polling mode according to embodiments. Method 500 begins at step 502, where device driver 40 starts an IO command batch by sending IO commands from an IO submission queue 212 to the storage device (e.g., SSD 26). At step 504, a polling routine of storage subsystem 203 (e.g., polling logic 223 and/or polling logic 222) accumulates OIO commands before polling. Once enough OIO commands are accumulated, method 500 proceeds to step 506. At step 506, the polling routine polls for IO completions. At step 508, while the polling routine executes, storage device queues IO completions. At step 510, the polling routine checks for any IO completions. If there are none, method 500 continues polling at step 506. If there are IO completions, method 500 proceeds to step 512. At step 512, storage subsystem 203 handles the IO completions. At step 514, storage subsystem 203 determines if there are more completions to handle. If so, method 500 returns to step 504. Otherwise, method 500 proceeds to step 516, where device driver 40 ends the IO command batch.

Figure 6:
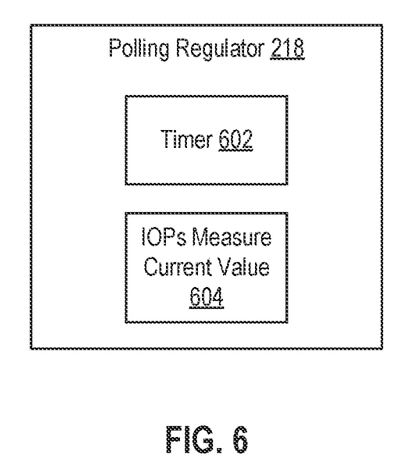
FIG. 6 is a block diagram depicting a polling regulator according to embodiments.

FIG. 6 is a block diagram depicting polling regulator 218 according to embodiments. Polling regulator 218 includes a timer 602 and an IOPs measure current value 604. Polling regulator 218 sets the IOPs measure current value 604 to a value returned from IOPs meter 216 in response to a request for the current IOPs for the device. Polling regulator 218 resets timer 602 in response to IOPs measure current value 604 being below the second threshold (Val_2) (step 322). Embodiments of method 300 and timer 602 refer to a countdown timer that counts down from an initial value until reaching an end value (expiring). In other embodiments, timer 602 can count up from an initial value until reaching an end value (expiring).

While some processes and methods having various operations have been described, one or more embodiments also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

One or more embodiments of the present invention may be implemented as one or more computer programs or as one or more computer program modules embodied in computer readable media. The terms computer readable medium or non-transitory computer readable medium refer to any data storage device that can store data which can thereafter be input to a computer system. Computer readable media may be based on any existing or subsequently developed technology that embodies computer programs in a manner that enables a computer to read the programs. Examples of computer readable media are hard drives, NAS systems, read-only memory (ROM), RAM, compact disks (CDs), digital versatile disks (DVDs), magnetic tapes, and other optical and non-optical data storage devices. A computer readable medium can also be distributed over a network-coupled computer system so that the computer readable code is stored and executed in a distributed fashion.

Certain embodiments as described above involve a hardware abstraction layer on top of a host computer. The hardware abstraction layer allows multiple contexts to share the hardware resource. These contexts can be isolated from each other, each having at least a user application running therein. The hardware abstraction layer thus provides benefits of resource isolation and allocation among the contexts. Virtual machines may be used as an example for the contexts and hypervisors may be used as an example for the hardware abstraction layer. In general, each virtual machine includes a guest operating system in which at least one application runs. It should be noted that, unless otherwise stated, one or more of these embodiments may also apply to other examples of contexts, such as containers. Containers implement operating system-level virtualization, wherein an abstraction layer is provided on top of a kernel of an operating system on a host computer or a kernel of a guest operating system of a VM. The abstraction layer supports multiple containers each including an application and its dependencies. Each container runs as an isolated process in user-space on the underlying operating system and shares the kernel with other containers. The container relies on the kernel's functionality to make use of resource isolation (CPU, memory, block I/O, network, etc.) and separate namespaces and to completely isolate the application's view of the operating environments. By using containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Boundaries between components, operations, and data stores are somewhat arbitrary, and particular operations are illustrated in the context of specific configurations. Other allocations of functionality are envisioned and may fall within the scope of the appended claims. In general, structures and functionalities presented as separate components in exemplary configurations may be implemented as a combined structure or component. Similarly, structures and functionalities presented as a single component may be implemented as separate components. These and other variations, additions, and improvements may fall within the scope of the appended claims.

What is claimed is:

1. A method of processing input/output (IO) between system software executing in a computer and a storage device, comprising:
sending, from the system software, IO commands to the storage device;
handling, by the system software, IO completion messages from the storage device; in an interrupt mode;
determining, while processing the IO commands, a first value for a measure of IO operations per second (IOPs) of the storage device;
determining, by a device driver of the system software, that a first condition is met, the first condition being that the measure of IOPs satisfies a threshold for enabling a polling mode;
determining, by the device driver, that a second condition is met, the second condition being that a timer, which was previously started in the interrupt mode, has not expired; and
maintaining, by the device driver, the interrupt mode in response to the second condition despite the first condition.

2. The method of claim 1, wherein the threshold comprises a first threshold for enabling the polling mode and a second threshold, lower than the first threshold, for enabling the polling mode, and wherein the first condition comprises the measure of IOPs being between the first and second thresholds.

3. The method of claim 2, further comprising:
updating, while processing the IO commands, the measure of IOPs to a second value;
determining, by the device driver after the step of updating, that a third condition is met, the third condition being that the measure of IOPs exceeds the first threshold;
enabling, by the device driver, the polling mode and disabling the interrupt mode in response to the third condition regardless of a state of the timer.

4. The method of claim 2, further comprising:
updating, while processing the IO commands, the measure of IOPs to a second value;
determining, by the device driver after the step of updating, that a third condition is met, the third condition being that the measure of IOPs is less than the second threshold;
maintaining, by the device driver, the interrupt mode in response to the third condition.

5. The method of claim 3, further comprising:
resetting, by the device driver, the timer.

6. The method of claim 2, further comprising:
updating, while processing the IO commands, the measure of IOPs to a second value;
determining, by the device driver after the step of updating, that a third condition is met, the third condition being that the measure of IOPs is between the first and second thresholds;
determining, by the device driver, a fourth condition that the timer has expired; and
enabling, by the device driver, the polling mode and disabling the interrupt mode in response to both the third condition and the fourth condition.

7. The method of claim 1, wherein the system software comprises a hypervisor executing on a hardware platform of the computer, and wherein the IO commands originate from guest software executing in a virtual machine (VM) supported by the hypervisor.

8. The method of claim 1, wherein the system software comprises a host operating system executing on a hardware platform of the computer, and wherein the IO commands originate from a process supported by the host operating system.

9. The method of claim 1, wherein the interrupt mode comprises the device driver waiting for completion of an outstanding IO (OIO) command in the IO commands and the storage device generating a hardware interrupt in response to completing the OIO command.

10. The method of claim 1, wherein the polling mode comprises the device driver polling for completion, by the storage device, of an outstanding IO (OIO) command in the IO commands.

11. A non-transitory computer readable medium comprising instructions to be executed in a computing device to cause the computing device to carry out a method of input/output (IO) between system software executing in a computer and a storage device, comprising:
sending, from the system software, IO commands to the storage device;
handling, by the system software, IO completion messages from the storage device in an interrupt mode;
determining, while processing the IO commands, a first value for a measure of IO operations per second (IOPs) of the storage device;
determining, by a device driver of the system software, that a first condition is met, the first condition being that the measure of IOPs satisfies a threshold for enabling a polling mode;
determining, by the device driver, that a second condition is met, the second condition being that a timer, which was previously started in the interrupt mode, has not expired; and
maintaining, by the device driver, the interrupt mode in response to the second condition despite the first condition.

12. The non-transitory computer readable medium of claim 11, wherein the threshold comprises a first threshold for enabling the polling mode and a second threshold, lower than the first threshold, for enabling the polling mode, and wherein the first condition comprises the measure of IOPs being between the first and second thresholds.

13. The non-transitory computer readable medium of claim 12, further comprising:
updating, while processing the IO commands, the measure of IOPs to a second value;
determining, by the device driver after the step of updating, that a third condition is met, the third condition being that the measure of IOPs exceeds the first threshold;
enabling, by the device driver, the polling mode and disabling the interrupt mode in response to the third condition regardless of a state of the timer.

14. The non-transitory computer readable medium of claim 12, further comprising:
updating, while processing the IO commands, the measure of IOPs to a second value;
determining, by the device driver after the step of updating, that a third condition is met, the third condition being that the measure of IOPs is less than the second threshold;

maintaining, by the device driver, the interrupt mode in response to the third condition.

15. The non-transitory computer readable medium of claim 12, further comprising:
    updating, while processing the IO commands, the measure of IOPs to a second value;
    determining, by the device driver after the step of updating, that a third condition is met, the third condition being that the measure of IOPs is between the first and second thresholds;
    determining, by the device driver, a fourth condition that the timer has expired; and
    enabling, by the device driver, the polling mode and disabling the interrupt mode in response to both the third condition and the fourth condition.

16. A computer system, comprising:
    a hardware platform comprising an interface to a storage device;
    system software, executing on the hardware platform, configured to:
        send IO commands to the storage device;
        handle IO completion messages from the storage device in an interrupt mode;
        determine, while processing the IO commands, a first value for a measure of IO operations per second (IOPs) of the storage device;
        determine that a first condition is met, the first condition being that the measure of IOPS satisfies a threshold for enabling a polling mode;
        determine that a second condition is met, the second condition being that a timer started in an interrupt mode has not expired; and
        maintain the interrupt mode in response to the second condition despite the first condition.

17. The computer system of claim 16, wherein the threshold comprises a first threshold for enabling the polling mode and a second threshold, lower than the first threshold, for enabling the polling mode, and wherein the first condition comprises the measure of IOPs being between the first and second thresholds.

18. The computer system of claim 17, wherein the system software is configured to:
    update, while processing the IO commands, the measure of IOPs to a second value;
    determine, after update of the measure of IOPs, that a third condition is met, the third condition being that the measure of IOPs exceeds the first threshold;
    enable the polling mode and disabling the interrupt mode in response to the third condition regardless of a state of the timer.

19. The computer system of claim 17, wherein the system software is configured to:
    update, while processing the IO commands, the measure of IOPs to a second value;
    determine, after update of the measure of IOPs, that a third condition is met, the third condition being that the measure of IOPs is less than the second threshold;
    maintain the interrupt mode in response to the third condition.

20. The computer system of claim 17, wherein the system software is configured to:
    update, while processing the IO commands, the measure of IOPs to a second value;
    determine, after update of the measure of IOPs, that a third condition is met, the third condition being that the measure of IOPs is between the first and second thresholds;
    determine a fourth condition that the timer has expired; and
    enable the polling mode and disabling the interrupt mode in response to both the third condition and the fourth condition.

* * * * *